Jan. 3, 1967     I. S. HOUVENER     3,295,878
FASTENING APPARATUS
Filed July 6, 1964     3 Sheets-Sheet 1
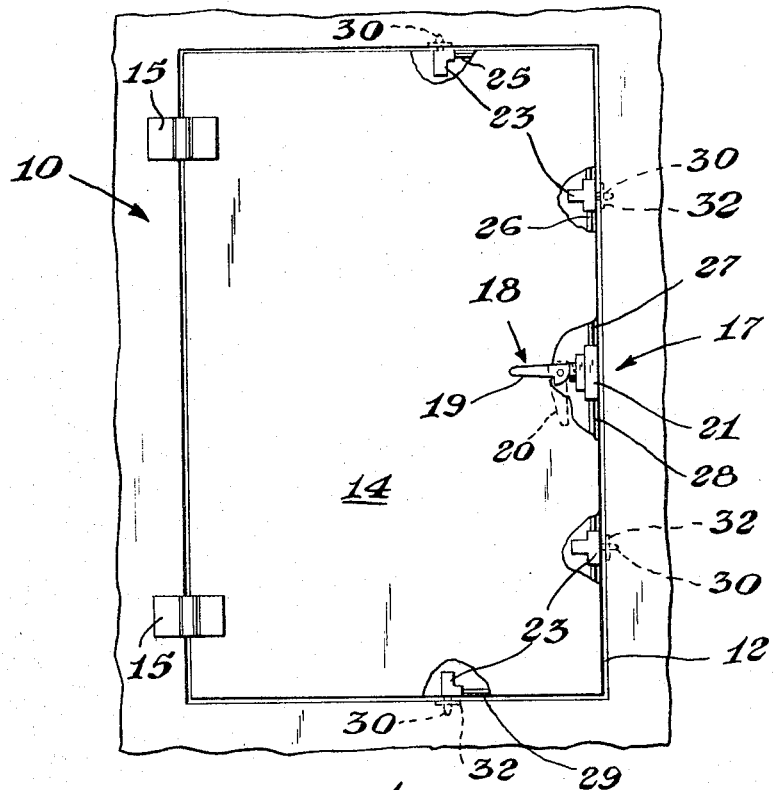
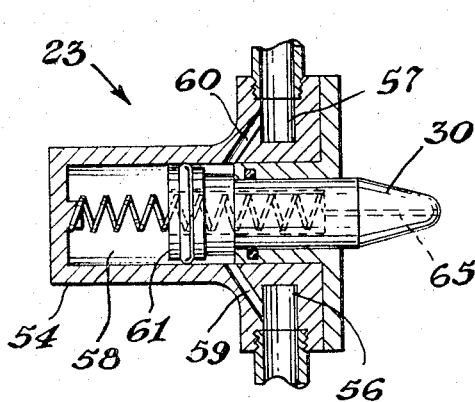
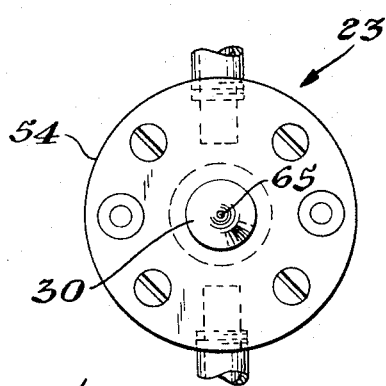
INVENTOR.
Irving S. Houvener
BY
ATTORNEY INVENTOR.
Irving S. Houvener
ATTORNEY Jan. 3, 1967  I. S. HOUVENER  3,295,878
FASTENING APPARATUS
Filed July 6, 1964  3 Sheets-Sheet 3
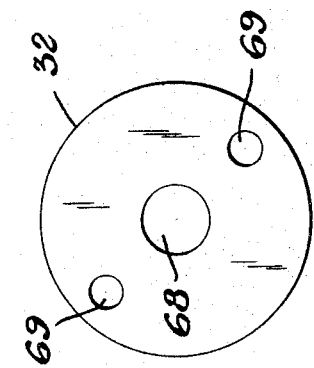
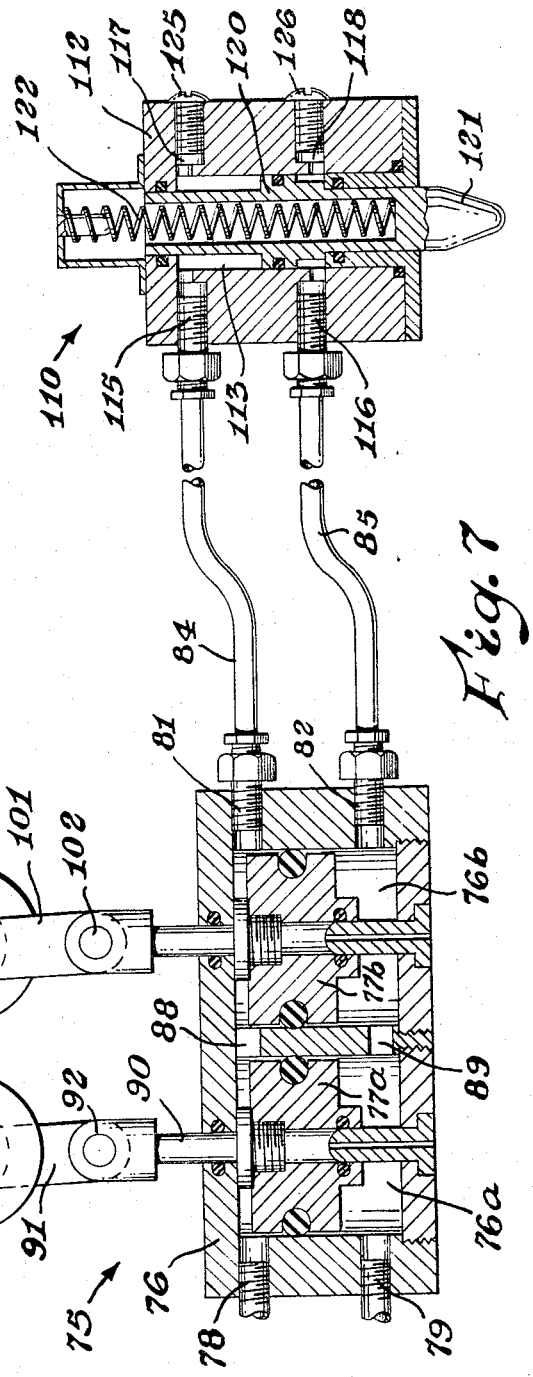
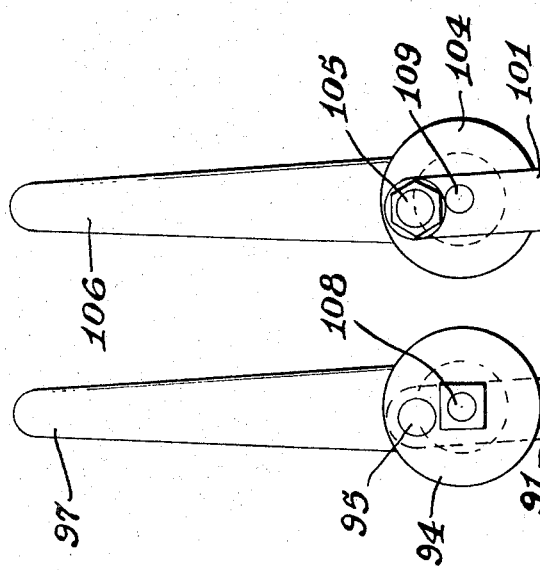
INVENTOR.
Irving S. Houvener
BY
AGENT
ATTORNEY

United States Patent Office 3,295,878
Patented Jan. 3, 1967

3,295,878
FASTENING APPARATUS
Irving S. Houvener, Midland, Mich., assignor to The Dow Chemical Company, Midland, Mich., a corporation of Delaware
Filed July 6, 1964, Ser. No. 380,367
7 Claims. (Cl. 292—144)

This invention relates to a fastening apparatus and more particularly relates to an improved fastening apparatus for use in conjunction with removable plugs, such as doors and the like.

In many applications, relatively large heavy doors must be employed, particularly in insulated rooms or containers. As a matter of safety, such doors must be readily opened from either side even when an opposite side is locked. Frequently, multiple latches are employd in order to adequately secure doors of either relatively great weight or thickness particularly in applications where one, two or even three separate gaskets are utilized in order to prevent heat loss or gain. Various mechanical movements are utilized and often suffer from such defects as wear, excessive friction in the mechanism and a requirement that motion must be transmitted through a relatively complicated set of linkages if multiple bolts are to be operated. Such closures become particularly critical where an assembly requires minimum weight and maximum resistance to vibration such as, for example, in shipping containers particularly adapted to be used for air cargo and insulated containers such as trailers and the like which are transported by road, by sea and on railroads.

It is an object of the present invention to provide an improved locking means for door plugs and the like which are capable of operating multiple bolts.

A further object of the invention is to provide an improved closure means which does not require complex mechanical linkages.

A further object of the invention is to provide an improved door closure in which the bolts are readily positioned in a desired location remote from the actuating means.

These benefits and other advantages in accordance with the present invention are readily achieved in a latching mechanism comprising an actuating means and a plurality of bolt members selectively positioned by the actuating means comprising in cooperative combination an actuating means comprising a master hydraulic cylinder having at least one piston adaped to displace fluid from the cylinder, a first actuating means in operative engagement with the piston adapted to force the piston into the cylinder and displace fluid therefrom, a second actuating means functioning as the first actuating means, and so constructed and arranged so that each of the actuating means operates independently of each other, a plurality of hydraulic bolt actuating cylinders remotely disposed from the master hydraulic cylinder and in communication therewith by means of a conduit, each of the bolt actuating cylinders in cooperative combination with a bolt so constructed and arranged so as to engage a strike.

In the simplest embodiment of the invention the bolt actuating cylinders are so constructed and arranged so as to maintain the bolt in a strike engaging position with a minimum of hydraulic fluid disposed within the bolt actuating cylinder and to retract the bolt into a non-strike engaging position when either of the actuating means of the master hydraulic cylinder has expressed a major portion of the fluid therefrom, the master hydraulic cylinder being so constructed and arranged that the piston thereof is resiliently tensioned to maintain a maximum volume of fluid therein when the piston is not forced into the cylinder by one of the actuating means, each of the bolt actuating cylinders being so constructed and arranged that the bolt is resiliently tensioned toward a strike engaging position.

Further features and advantages of the present invention will become more apparent from the following specification when taken in connection with the drawings wherein:

FIGURE 1 is a schematic representation of a door plug pivotally positioned within the door opening of an enclosure having a latching mechanism in accordance with the invention.

FIGURES 4 and 5 are sectional views of a bolt positioning cylinder employed in FIGURE 1.

FIGURE 6 depicts a strike adapted to be employed with the bolt of FIGURES 4 and 5.

FIGURE 7 is a simplifid schematic representation of an alternate embodiment of the invention wherein "double-acting" components are employed.

Figure 3:
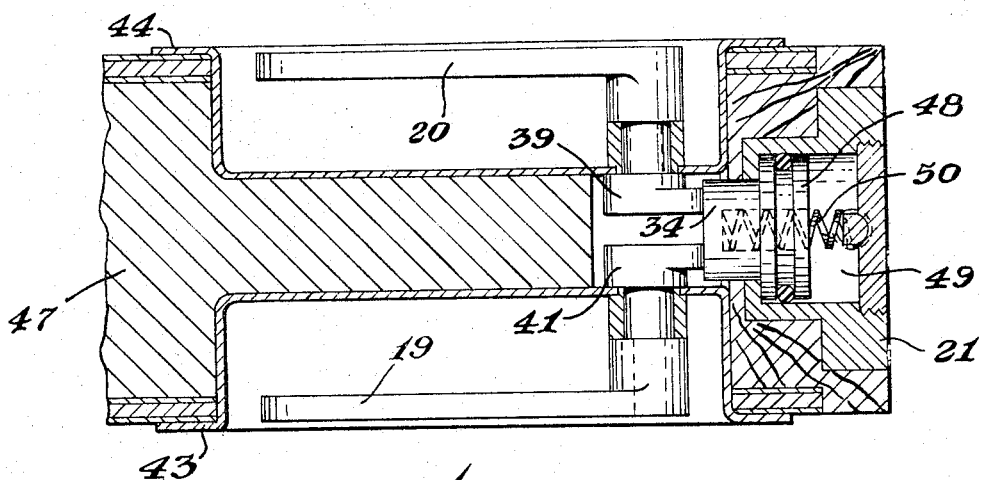
FIGURE 3 is a sectional view of the actuating means of FIGURE 2 taken along the line 3—3.

In FIGURE 1, there is schematically illustrated a portion of an enclosure 10 having defined therein a door opening 12. A door or closure 14 is pivotally supported within the opening 12 by the hinges 15. A latching mechanism or closure system generally designated by the reference numeral 17 is disposed within the door 14. The latching system comprises an actuating means 18 consisting of an operating handle 19, a second operating handle 20, a hydraulic cylinder 21 and a plurality of bolt actuating hydraulic cylinders 23 remotely disposed from the actuating means 18 and interconnected by means of conduits 25, 26, 27, 28 and 29. Each of the cylinders 23 has a bolt or strike engaging member 30. In the wall of the enclosure 10 adjacent the door opening 12 are disposed a plurality of strikes 32 adapted to engage the bolts 30 when the door 14 closes the opening 12.

Figure 2:
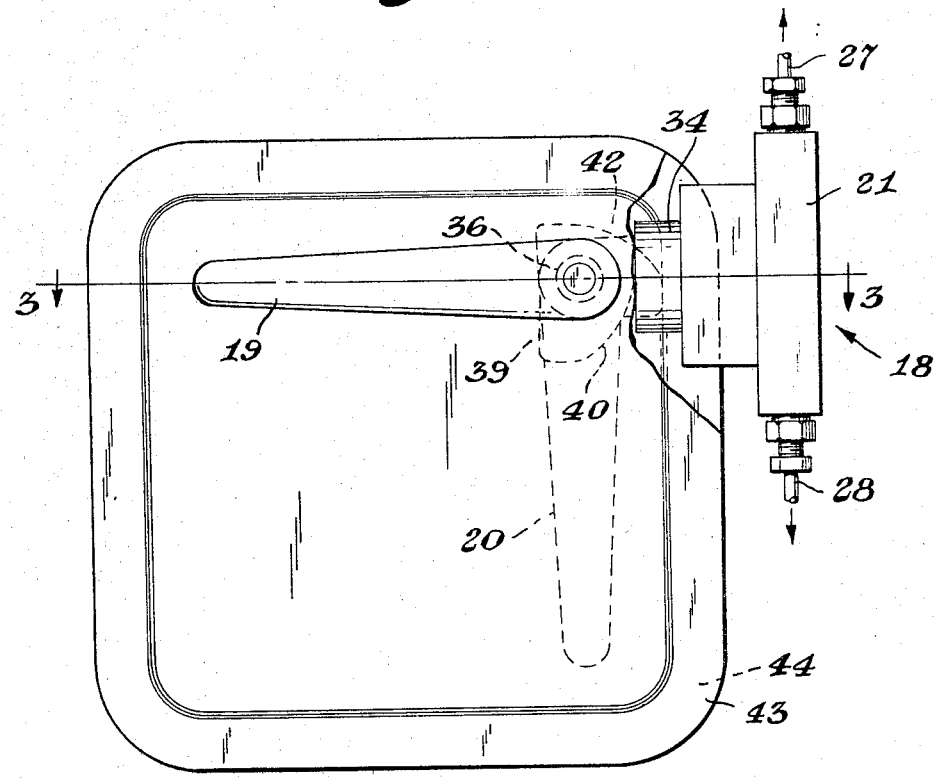
FIGURE 2 is a schematic representation of a side view of the actuating means of the installation of FIGURE 1.

In FIGURE 2, there is schematically represented the actuating means 18 of FIGURE 1 which comprises a hydraulic cylinder 21 in operative communication with the conduits 27 and 28. The hydraulic cylinder 21 has a piston actuating means 34 adapted to reduce and increase the volume of liquid contained within the cylinder 21. A pair of pivotally mounted handles 19 and 20 are disposed generally adjacent the piston actuating means 34. Each of the handles 19 and 20 are pivotally supported about a common axis on the pivot 36. In operative association with the handle 19 is a cam 39 having a camming face 40 so constructed and arranged as to displace the piston actuating means 34 of the hydraulic cylinder 31 by engaging the actuating means 34. The handle 20 has a similar cam 41 having a camming face 42 adapted to operate in a like manner to that of the handle 19 and cam 39. The handles 19 and 20 are pivotally supported by means of the escutcheons 43 and 44.

FIGURE 3 illustrates a schematic sectional view of the representation of FIGURE 2 along the line 3—3 when the assembly 18 is positioned within a door generally designated by the reference numeral 47. The hydraulic cylinder 21 is provided with a piston 48 which is in operating engagement with piston actuating means 34. The hydraulic cylinder 21 in cooperative combination with the piston 48 defines a hydraulic fluid space 49. A spring 50 is positioned within the space 49 in such a manner as to resiliently tension the piston to a position which allows the space 49 to be a maximum.

FIGURES 4 and 5 represent two views of the bolt retracting or actuating cylinders 23 which operate the bolts 30. The cylinders 23 comprise a housing 54 which defines hydraulic fluid passageways 56 and 57, an internal cylindrical cavity 58 and fluid passageways 59 and 60 which which provide full communication between the passageways 56 and 57, respectively, and the cavity 58. Disposed within the cavity 58 is a piston 61 which is rigidly affixed to the bolt 30. A spring 63 resiliently engages the bolt 30 and maintains the bolt in a strike engaging position. A passageway 65 within the bolt 30 provides communication between the portion of the space 58 remote from the hydraulic fluid passageways 59 and 60.

FIGURE 6 depicts a view of a strike 32 which defines an aperture 68 adapted to slidably receive the bolt member 30. The strike 32 defines the securing apertures or fastener holes 69.

In operation of the embodiment of the invention depicted in FIGURES 1–5, the actuating means 18 is installed within a door substantially as is illustrated in FIGURES 2 and 3. The escutcheons 43 and 44 are positioned in such a manner that the cams 39 and 41 are adapted to force the piston actuating means 34 into the hydraulic cylinder 21 to a desired degree. Bolt actuating cylinders 23 are positioned in desired locations and the corresponding strikes 32 installed in the edge portion of the door opening. The cylinder 21 is then connected by means of a suitable conduit to the nearest bolt actuating cylinders. Another conduit is then connected to the bolt actuating cylinders adjacent the cylinder or connected to the cylinder 21 until, in effect, the bolt actuating cylinders 23 have been connected either in series or in parallel, or in series-parallel arrangement with the actuating or master cylinder 21. If each of the bolt actuating cylinders illustrated in FIGURE 4 has two hydraulic fluid passageways, fluid may flow in one of the passageways such as the passageway 56 through the passageway 59 into a portion of the space 58 between the piston and the passageways 59 and 60, out through the passageways 60 and 57 and into another cylinder. In the terminal cylinders or any particular line coming from the actuating means or master cylinder 21, one passage is closed. Therefore, when either of the operating handles 19 or 20 is depressed causing the cams 39 or 41 to engage the master cylinder piston actuating means 34, hydraulic fluid is expressed from the space 58 and flows through the various conduits to the hydraulic bolt actuating cylinders 23 and causes the bolt to be withdrawn within the housing 54 and when the door is closed, such bolts are withdrawn from the opening 68 of the strike 32.

A leak-proof seal of the piston in any hydraulic system is substantially impractical. Therefore, the passageway 65 is provided within the bolt 30 to provide the means of exit for any hydraulic fluid which would leak past the piston 61 into the portion of the space 58 remote from the passageways 59 and 60. Thus, no leakage of the hydraulic fluid into the door will occur. All leakage from the seals will appear on the outer surface of the bolt 30. Conveniently, the uppermost bolt actuating cylinder 23 in the door is installed in such a manner that a passageway is provided with a removable plug and the supply of hydraulic fluid may be readily replenished.

Door closures in accordance with that of FIGURE 1 provide remarkably trouble-free operation under a wide variety of conditions.

In FIGURE 7, there is schematically illustrated an alternate embodiment of the invention generally designated by the reference numeral 75. The assembly 75 comprises a master cylinder assembly 76 having a first master cylinder 76a and a second master cylinder 76b. The master cylinder 76a has disposed therein a piston 77a and the master cylinder 76b has therein a piston 77b. The cylinder 76a has ports 78 and 79 providing communication with suitable fluid transmitting conduits, not shown. The cylinder 76b has passageways 81 and 82 providing communication with the fluid transmitting conduits 84 and 85. The cylinders 76a and 76b have the common communication passageways 88 and 89. Thus, in effect, the master cylinder assembly 76 comprises two sub-master cylinders in parallel connection. The piston 77a is in operative connection with a piston rod 90 which, in turn, is in cooperative combination with a pivotally mounted link 91 which is pivotally mounted to the piston rod 90 by the pivot 92. The opposite end of the link 91 is secured to a cam 94 by means of the pivot point 95. The cam 94, in turn, is actuated by an operating handle 97. The piston 77b is provided with a piston rod 100 which is pivotally connected to a link 101 by means of a pivot 102. The link 101 is in operative engagement with a cam 104 by means of a pivot 105. The cam 104 is in operative engagement with the operating handle 106. The handles 97 and 106 are pivoted about fixed pivots 108 and 109, respectively. The conduits 84 and 85 terminate at a bolt actuating cylinder 110. The cylinder 110 comprises a housing 112 defining therein a generally cylindrical cavity 113. The housing 112 defines the fluid passageways 115, 116, 117 and 118, respectively, effectively providing a double-ported, double-acting hydraulic cylinder. Disposed within the cavity 113 is a piston 120 which is in operative connection with a bolt 121 adapted to be withdrawn into the cavity 113 and disengage a strike in the manner of the embodiment illustrated in FIGURES 1–6. A resilient tensioning means or spring 122 is positioned in such a manner so as to force the piston 120 and move the bolt 121 into a strike engaging position. The passageways 117 and 118 are closed by means of plugs 125 and 126.

Thus, the embodiment of FIGURE 7 is adapted to operate in a generally similar manner to that of the system illustrated in FIGURES 1–6. Any suitable number of bolt actuating cylinders 110 may be series or parallel, or series-parallel connected to the master cylinder 76 and the bolts 121 are positively positioned by means of either of the actuating handles 106 or 97. This embodiment of the invention is particularly advantageous for use on doors which are subject to severe icing where positive locking is required. In the embodiment of FIGURES 1–6 return of the bolt, that is, positioning of the bolt into the locking position that is in engagement with the aperture 68 of the strike 32 depends upon the action of the spring 63 and spring 50 in the master cylinder to withdraw the hydraulic fluid therefrom.

The embodiment of FIGURE 7 provides a positive indication if any of several bolts fail to emerge from the cylinder 110, as the difference in the positioning of the handle such as 106 or 97 from the full closed position will be proportional to the number of cylinders failing to respond to the closing action. Thus, when a handle such as the handle 106 or 97 is in the full closed position or full open position, all cylinders must be in the corresponding position unless a major failure has occurred such as rupture of the hydraulic line or severe loss of fluid.

The locking mechanisms in accordance with the present invention are found eminently satisfactory for a wide variety of closures, particularly when goods are transported at high and low temperatures. The locking mechanisms are found to be remarkably resistant to vibration and are long lasting.

As is apparent from the foregoing specification, the apparatus of the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto appended claims.

What is claimed is:

1. A latching mechanism comprising an actuating means and a plurality of bolt members selectively positioned by the actuating means, the latching mechanism comprising in cooperative combination an hydraulic actuating means comprising a master hydraulic cylinder having one piston adapted to displace the fluid from the cylinder, a first operating handle in operative engagement with the piston adapted to force the piston into the cylinder and displace fluid therefrom, a second operating handle in operative engagement with the piston and adapted to force the piston into the cylinder and displace fluid therefrom, the first and second operating handles having means connecting the handles to the piston and the handles so constructed and arranged so that each of the operating handles operate independently of each other, a plurality of hydraulic bolt actuating cylinders remotely disposed from the master hydraulic cylinder and in communication therewith by means of a conduit, each of the bolt actuating cylinders in cooperative combination with a bolt so constructed and arranged so as to engage a strike.

2. The apparatus of claim 1 wherein the bolt actuating cylinders are so constructed and arranged so as to maintain the bolt in a strike engaging position when either of the operating handles of the master hydraulic cylinder has expressed a major portion of the fluid therefrom, the master hydraulic cylinder being so constructed and arranged that the piston thereof is resiliently tensioned to maintain a maximum volume of fluid therein when the piston is not forced into the cylinder by one of the operating handles, each of the bolt actuating cylinders being so constructed and arranged that the bolt is resiliently tensioned toward a strike engaging position.

3. The apparatus of claim 2 wherein the bolt actuating cylinder comprises in cooperative combination a cylinder, a housing which defines at least one hydraulic fluid passageway, an internal cylindrical cavity, the housing having one closed end, a piston disposed within the cavity and so constructed and arranged so as to be forced toward the closed end by the entrance of fluid into the cavity, resilient tensioning means disposed within the cavity, a bolt in operative connection with the piston and adapted to be drawn toward the housing by the entrance of fluid into the cavity, a passageway within the bolt communicating with the portion of the cavity within the housing remote from the hydraulic fluid inlet.

4. The apparatus of claim 3 wherein the bolt actuating cylinder is provided with at least two passageways to the exterior of the housing adapted for the flow of hydraulic fluid.

5. The apparatus of claim 1 wherein the master cylinder actuating means has at least two independently operating handles adapted to position the piston of the master cylinders so constructed and arranged so the handles are on opposite sides of the door.

6. The apparatus of claim 1 wherein the master cylinder and the bolt actuating cylinders are double acting hydraulic cylinders.

7. A latching mechanism comprising an actuating means and a plurality of bolt members selectively positioned by the actuating means, the latching mechanism comprising in cooperative combination two hydraulic actuating means each comprising a master hydraulic cylinder and each having one piston adapted to displace the fluid from the cylinder, each cylinder including fluid passage means communicating with opposite sides of the piston and fluid passage means between cylinders to provide a parallel connection between the two master cylinders, the master cylinders being double acting hydraulic cylinders, a first operating handle in operative engagement with one of the pistons adapted to force the piston into the cylinder and displace fluid therefrom, a second operating handle in operative engagement with the remaining piston and adapted to force the piston into the cylinder and displace fluid therefrom, the first and second operating handles having means connecting the handles to the respective pistons, the handles so constructed and arranged so that each of the operating handles operate independently of each other, a plurality of hydraulic bolt actuating cylinders remotely disposed from the master hydraulic cylinders and in communication therewith by means of a conduit, each of the bolt actuating cylinders in cooperative combination with a bolt so constructed and arranged so as to engage a strike.

References Cited by the Examiner

UNITED STATES PATENTS

| 965,270 | 7/1910 | Zelle | 92—61 X |
|---|---|---|---|
| 1,626,968 | 5/1927 | Reckler. | |
| 2,002,798 | 5/1935 | Renholdt | 92—146 X |
| 2,111,687 | 3/1938 | Webb. | |
| 2,179,495 | 11/1939 | Court et al. | 114—116 |
| 2,237,192 | 5/1941 | Minkow et al. | 292—144 X |
| 2,310,887 | 2/1943 | Anderson | 292—144 X |
| 2,688,865 | 9/1954 | Foster et al. | 292—144 X |

FOREIGN PATENTS 316,334  4/1934  Italy.

EDWARD C. ALLEN, *Primary Examiner.*

J. R. MOSES, *Assistant Examiner.*